Aug. 24, 1926. 1,597,429
J. BRINCIL
BEARING AND METHOD OF MAKING IT
Filed July 2, 1925
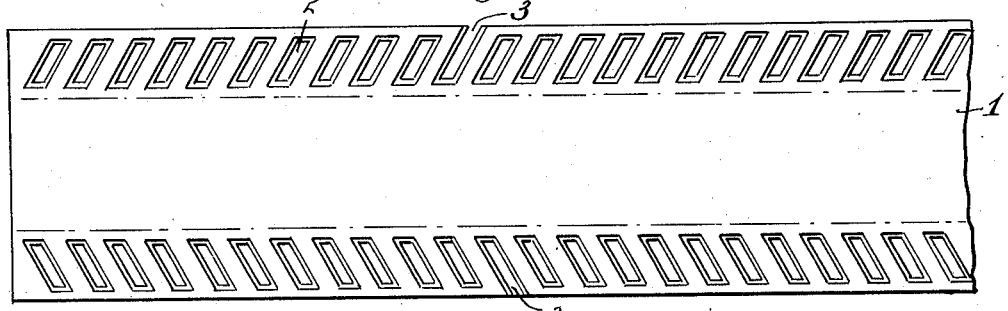
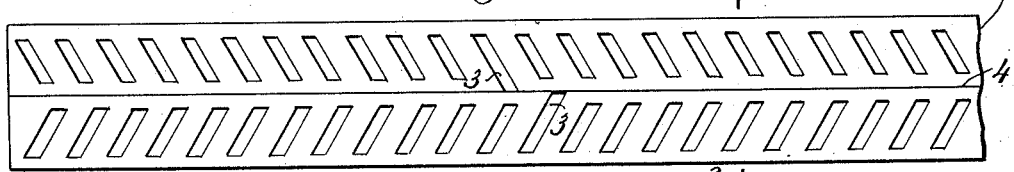
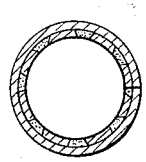
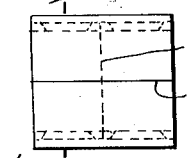
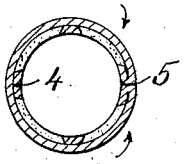
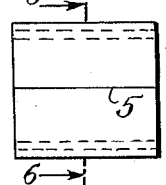
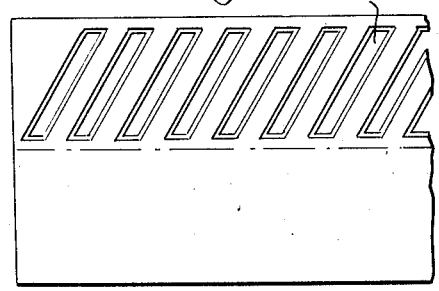
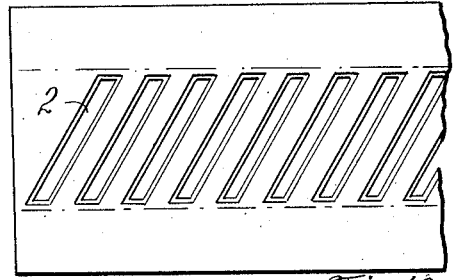
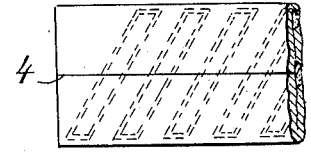
INVENTOR
Joseph Brincil
BY
Pennie, Davis, Marvin & Edmonds
his ATTORNEYS Patented Aug. 24, 1926.

1,597,429

UNITED STATES PATENT OFFICE.

JOSEPH BRINCIL, OF PLAINFIELD, NEW JERSEY.

BEARING AND METHOD OF MAKING IT.

Application filed July 2, 1925. Serial No. 41,067.

This invention relates to bearings and their manufacture, particularly to bearings of the self-lubricating type. It is old in making bearings of this type to provide the metal face of the bearing with inserts of graphite or other solid lubricant but it is difficult to make these inserts stay in place. It has been proposed to stamp depressions in the face of a strip of bearing metal, fill these depressions with graphite and then roll the strip into cylindrical form. This type of bearing is relatively inexpensive to make, but is not wholly satisfactory in use due to the fact that the graphite inserts are likely to be displaced owing to the fact that the depressions cannot be made to lock them in place. It has also been proposed to make self-lubricating bearings having dove-tailed, and hence locking grooves, by extruding metal through an annular die shaped to provide undercut grooves in the inner face of the tube, these grooves being subsequently filled with graphite which is held in place because of the shape of the grooves. Such a bearing, although satisfactory, is very expensive to make. It has also been proposed to perforate a strip of bearing metal, bend this strip into cylindrical form, place it within a second concentric unperforated cylinder and fill the perforations with the graphite. This bearing is also unsatisfactory not only because the graphite inserts are likely to fall out, but because the two cylindrical members of the bearing are likely to become separated unless they are permanently joined in some manner.

According to the present invention I have provided an inexpensive method of making a self-lubricating bearing which shall be free from the objections noted above and which may have as its lubricating element either graphite or other lubricating paste. In carrying out my invention I take a strip of bearing metal such as brass or bronze and perforate a section of it with a series of perforations and then fold the perforated and unperforated sections together to form a multi-ply strip. If graphite is to be used as a lubricant the perforations are then filled with graphite and the strip rolled and baked. It is then wound about an arbor, cut to the proper length and swaged to form a true cylindrical bushing bearing.

In the accompanying drawings I have illustrated certain preferred embodiments of my invention. In these drawings Figure 1 is a plan view of a strip of bearing metal the edges of which have been provided with a series of perforations; Figure 2 is a plan view of the strip shown in Figure 1 with the perforated edges folded over upon the unperforated mid-section; Figure 3 is a section taken along line 3—3 of Figure 2 after the perforations have been filled with graphite; Figure 4 is a section taken along line 4—4 of Figure 5 showing a completed bushing bearing made by bending the strip of Figure 2 about an arbor in the direction of its length; Figure 5 is a side view of the bushing bearing shown in Figure 4; Figure 6 is a section taken along line 6—6 of Figure 7 showing a bushing bearing made from the strip of Figure 2 bent about an arbor transversely, this bearing as illustrated being on a larger scale than the bearing of Figure 4; Figure 7 is a side view of the bearing shown in Figure 6; Figure 8 is a plan view of a strip of bearing metal one-half of which has been provided with a series of perforations; Figure 9 illustrates a still further modified form of perforated strip, the perforations in this case extending down the center of the strip leaving the edges unperforated, and Figure 10 is a plan view of the strip shown in Figure 9 with the unperforated edges folded over upon the perforated mid-section.

As illustrated in these drawings 1 represents a strip of bearing metal either of brass or bronze or other suitable material. In the form shown in Figure 1 this strip is provided along its edges with a series of oblique perforations 2 provided as illustrated with flaring side walls formed by passing the strip through a suitable press such as illustrated for example in my co-pending application Serial No. 41,066 filed July 2, 1925. Certain of these perforations may extend through to the very edges of the strip as illustrated at 3. The perforated edges of the strip 1 are then folded inwardly along the dot and dash line illustrated in Figure 1 until they meet along a line 4 as illustrated in Figure 2. The folding is done in such a manner that in the two-ply structure illustrated in Figure 2 the large ends of the perforations are innermost and adjacent the unperforated mid-section of the strip, thus forming a series of pockets having overhanging walls which act as retaining means for the lubricant. The lubricant, preferably a graphite paste, is then inserted by passing the strip beneath a hopper which forces it into the perforations as the strip passes. The strip with its lubricating insert is then preferably baked and rolled to compress or pack the graphite within the perforations.

If the bearing is to be used as a flat surface it is complete in the form illustrated in Figure 2 with the lubricant inserted. For most purposes, however, I desire to form the strip of Figure 2 into a cylindrical bushing. I do this by winding the strip about an arbor, not shown, with the perforations innermost, cutting off the strip to the necessary length, placing the unfinished bushing upon a second arbor of exactly the proper diameter and swaging it thereon to form a bushing bearing of the proper dimensions.

As illustrated in Figures 4 and 5 the strip in Figure 2 has been wound about the arbors longitudinally, that is, with the longitudinal axis of the strip placed circumferentially of the arbors. In that event the line 4 forms a circle interiorly of the bushing while the two abutting ends contact along line 5 which forms an element of the completed cylinder. This bushing, it will be noted, is of a length equal to the width of the folded strip, and furthermore the annular edges of the bushing are enclosed, being formed by the overturned parts of the strip 1. When such a bushing is employed in connection with a rotating shaft it will be noted that that section of the bearing adjacent the line 4 would remain unlubricated were it not for the extensions 3 on some of the perforations 2.

The strip shown in Figure 2 may also be wound transversely as illustrated in Figures 6 and 7, in which case line 4 becomes one of the elements of the cylinder and the abutting edges along the line 5, are the enclosed edges of the strip. In this case the circumference and not the length of the finished bushing is determined by the width of the folded strip. After the strip is wound the bushings themselves are cut transversely from the rolled strip. In this case therefore both ends of the bushing are open and the line of contact between the two plys clearly visible.

In Figure 8, I have illustrated a modified form of perforated strip in which half of the strip is perforated longitudinally and is intended to be folded over upon the unperforated half. In this case therefore there is but one enclosed edge and no line 4.

In Figures 9 and 10, I have illustrated a still further modified method of forming a bearing. In this case the strip is perforated down its mid-section leaving the edges unperforated. This strip is, in effect, the complement of the strip shown in Figure 1 and the resultant bearings are the same, except that the line of contact 4 between the folded edges lies exteriorly of the bearing instead of interiorly.

I claim:

1. The method of making a self-lubricating bearing which comprises forming perforations in a strip of bearing metal leaving part of the strip unperforated, folding the perforated and unperforated parts together and filling the perforations with a lubricating material.

2. The method of making a self-lubricating bearing which comprises forming perforations having flaring side walls in a strip of bearing metal leaving part of the strip unperforated, folding the perforated and unperforated parts together with the large end of the perforations adjacent the unperforated metal, and filling the perforations with a lubricating material.

3. The method of making a self-lubricating bushing bearing which comprises forming perforations in a strip of bearing metal leaving part of the strip unperforated, folding the perforated and unperforated parts together, filling the perforations with a lubricating material and bending the strip into cylindrical form.

4. The method of making a self-lubricating bushing bearing which comprises forming a series of perforations longitudinally of a strip of bearing metal leaving a longitudinal part of the strip unperforated, folding the perforated and unperforated parts together, filling the perforations with a lubricating material, and bending the strip into cylindrical form with the perforations innermost.

5. The method of making a self-lubricating bushing bearing which comprises punching a series of perforations along the edges of a strip of bearing metal leaving the center of the strip unperforated, folding the perforated parts until they meet, filling the perforations with a lubricating material and bending the strip into cylindrical form with the perforations innermost.

6. A self-lubricating bearing comprising a strip of bearing metal having one part perforated and another unperforated, the perforated and unperforated parts being folded together, and a lubricating material in the perforations.

7. A self-lubricating bearing comprising a strip of bearing metal having one part perforated with perforations having flaring side walls, and another unperforated, the perforated and unperforated parts being folded together with the large end of the perforations adjacent the unperforated metal, and a lubricating material in the perforations.

8. A self-lubricating bushing bearing comprising a strip of bearing metal having one part perforated and another unperforated, the perforated and unperforated parts being folded together and the two-ply structure rolled into cylindrical form with the perforations innermost, and a lubricating material in the perforations.

9. A self-lubricating bushing bearing, comprising multiple plies of a single strip of bearing metal, having one part perforated and another part unperforated, the perforated and unperforated parts being folded together, and the multiple ply structure rolled into cylindrical form with the perforations innermost, and a lubricating material in the perforations.

In testimony whereof I affix my signature.

JOSEPH BRINCIL.